Figure 2A:
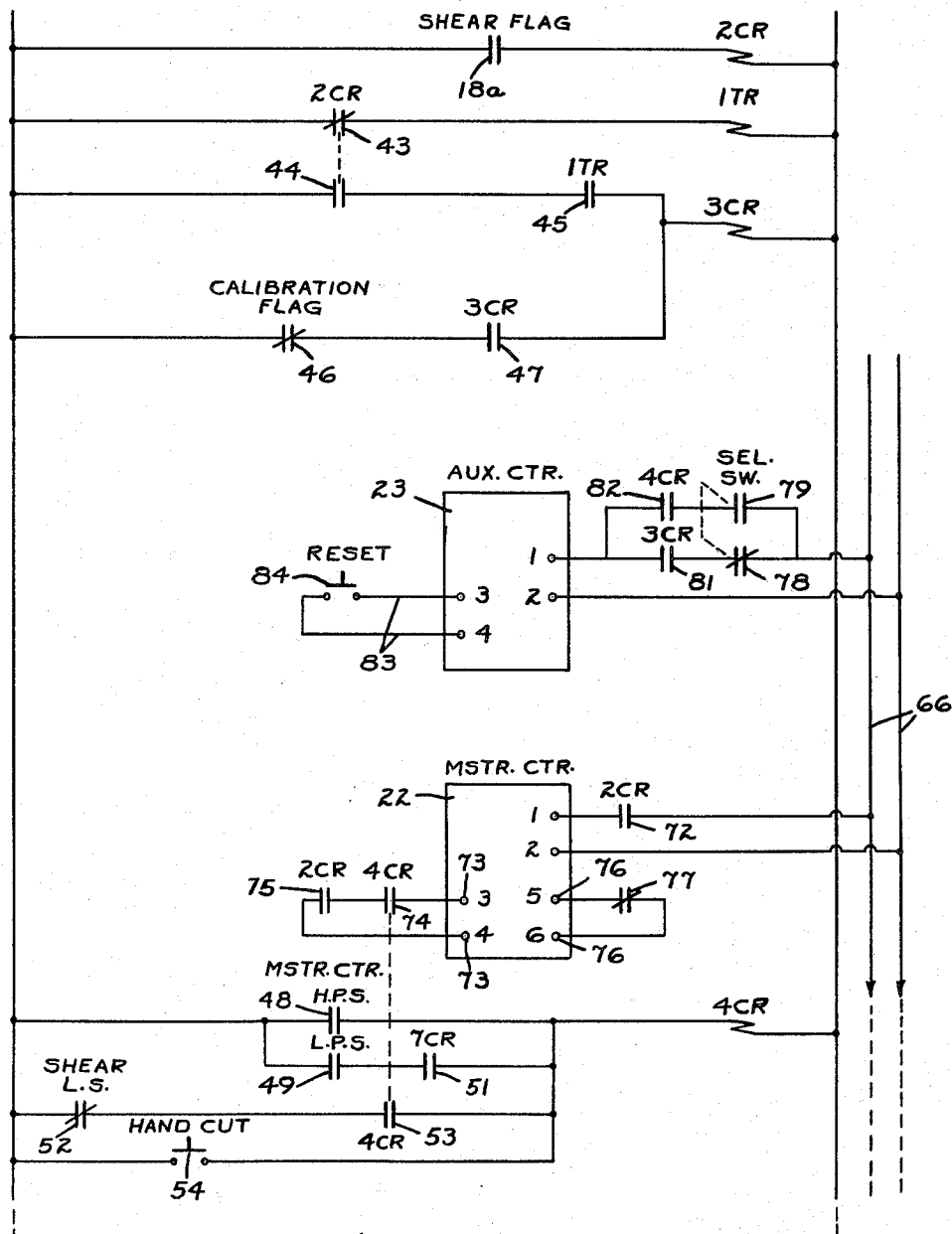

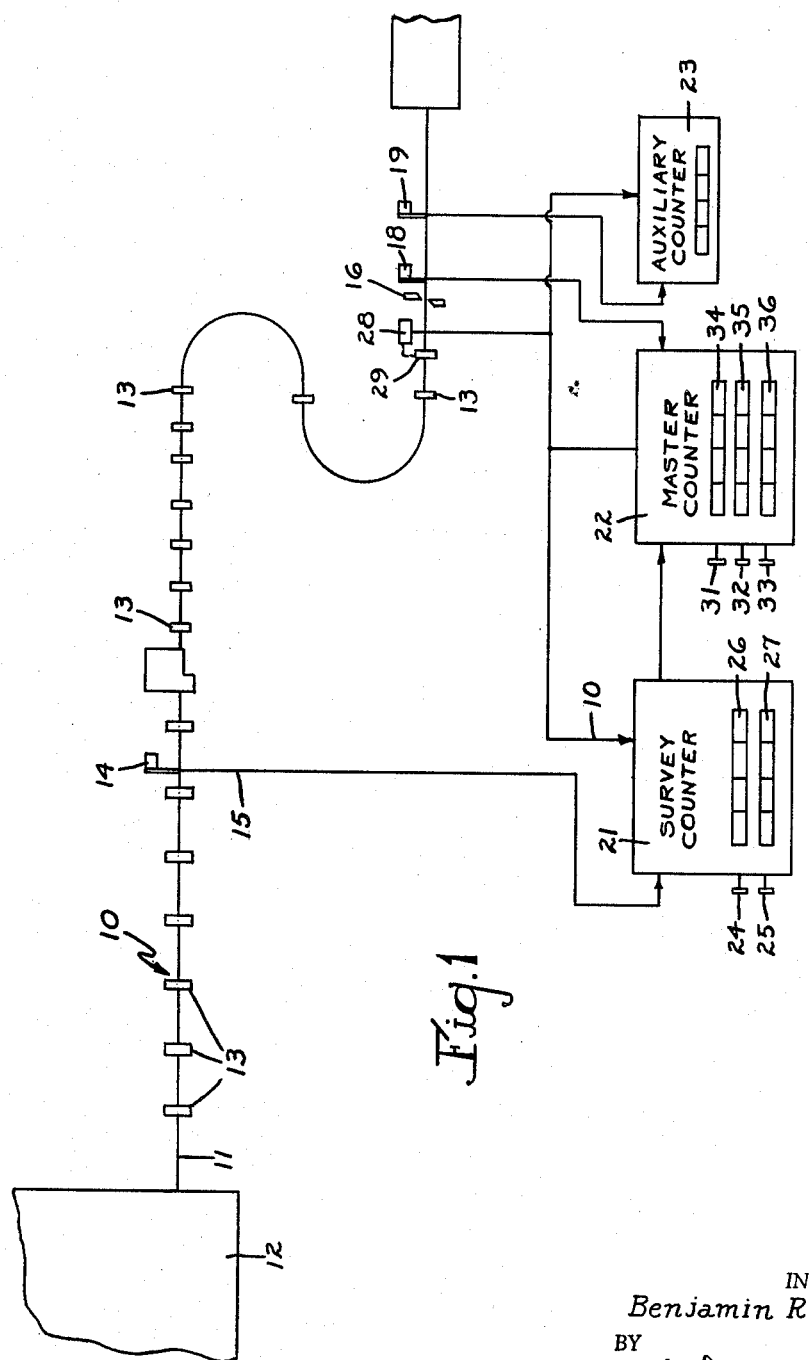

INVENTOR.
Benjamin R. Neely Jr.
BY
Russell, Chittick & Pfund
Attorneys

INVENTOR.
Benjamin R. Neely Jr.
BY
Russell, Chittick & Pfund
Attorneys

United States Patent Office 3,170,355
Patented Feb. 23, 1965

3,170,355
MAXIMUM AND MINIMUM LENGTH CONTROL FOR A ROLLING MILL SHEAR
Benjamin R. Neely, Jr., West Boylston, Mass., assignor to Morgan Construction Company, Worcester, Mass., a corporation of Massachusetts
Filed Sept. 1, 1961, Ser. No. 136,405
5 Claims. (Cl. 83—362)

This invention relates generally to apparatus for cutting individual lengths of material from a continuous supply and more particularly to an apparatus and method for regulating and controlling the operation of the shear to obtain lengths of the material greater than a predetermined minimum length.

There are many processes in industry which require the cutting of individual lengths of product from a continuous supply of material of indeterminable length and weight. In the steel industry it is a common practice to supply a billet of indeterminate length and weight to a plurality of sequential rolling stands to provide an elongated end product which is subsequently sheared into individual pieces of equal length to facilitate handling and for further processing. Since billets vary somewhat in length, cutting the rolled product produced from the billets generally results in a remainder section having a lesser length than the previous cut lengths. If this remainder section is of only slightly shorter size than the other sections it can usually be handled with little or no complications during subsequent operations. When the remainder section is below a predetermined minimum length difficulties are experienced with the short length which interferes with the handling apparatus for the product, resulting in obstructions and eventual shut-down of the operation.

This problem is present in the steel industry in rolling mill operations where multiple lengths of elongated rod are sheared and transferred to cooling beds. In the transferring operation to the cooling bed after shearing, a time delay is necessary to provide a gap between the butt end of one bar and the entrance of the lead end of a subsequent bar. This gap is normally provided by having rollers on a run-off table running approximately 10% faster than the rollers near the mill end to accelerate the cut length. In order to create sufficient gap, the product remaining on the slow-speed section of the table must not be less than a specific minimum length for a given mill speed. Otherwise, a short remainder would accelerate to high speed before the necessary gap between the lengths had been created. Naturally, the minimum length required to produce the necessary gap increases as mill speed increases. After a bar is transferred by the kick-off from the table rollers to the first notch of the cooling bed, the bar slides to a stop and is then advanced one notch by the carry-over. Several seconds are required for a bar to slide to a stop and to be advanced by the carry-over. The time required for this operation increases as the mill speed increases. This means that for higher mill speed longer lengths must be cut in order that each length may be individually carried across the cooling bed.

An object of the invention is to provide for selectively shearing an alternate length of product to assure that all lengths sheared from a random size billet will be longer than a predetermined minimum. Another object of this invention is to provide method and apparatus for ascertaining whether a remainder section resulting from a multiple cutting operation will be above or below a predetermined minimum length prior in time to the final shear operation so as to allow an alternate cut length for one of the multiple cuts thereby assuring a remainder of greater than the minimum length.

Another object of this invention is to provide method and apparatus for efficiently cutting elongated material into pieces in which no piece will have a length shorter than a predetermined minimum.

A further object of this invention is to provide a method and apparatus for shearing lengths from an elongated product which may be handled efficiently by a cooling bed.

Figure 2B:
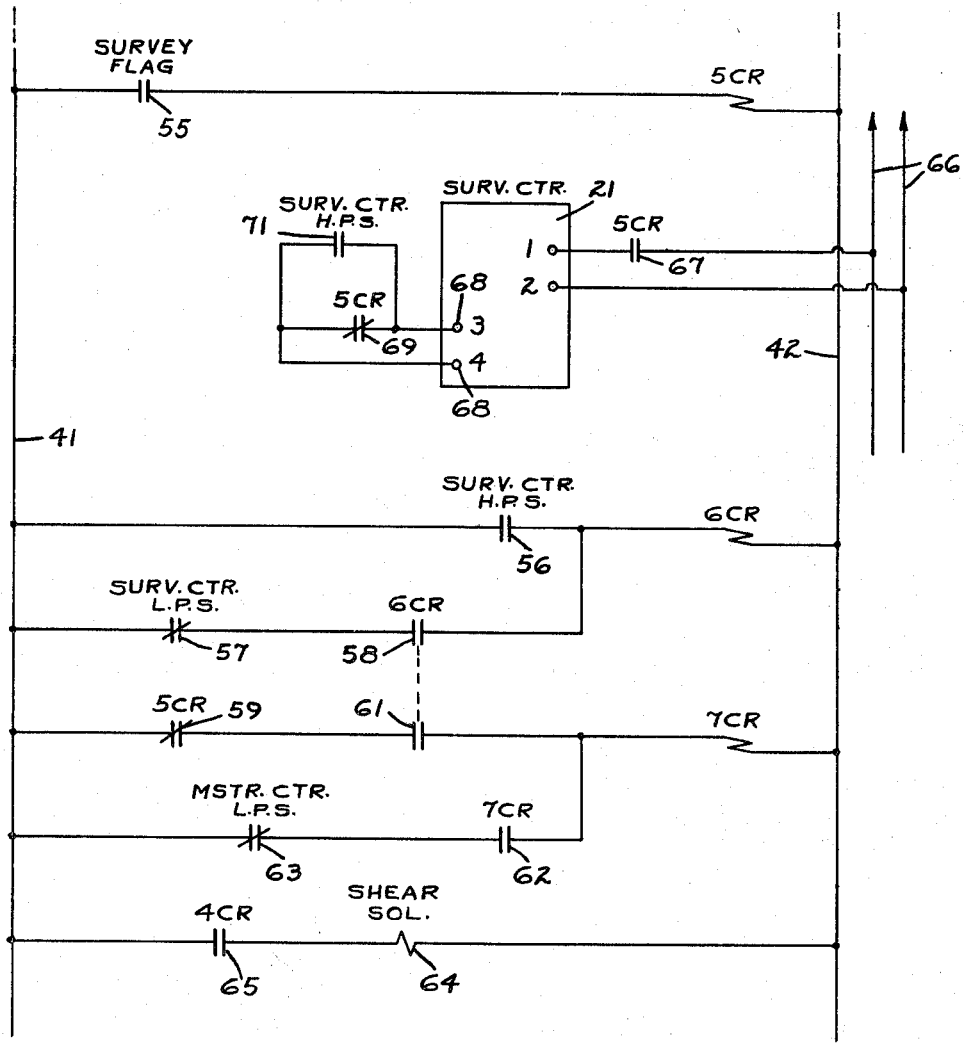

These and other objects will be apparent from the following detailed description taken in conjunction with the accompanying drawings in which:

FIG. 1 is a schematic plan view of a rolling mill operation embodying the invention; and FIGS. 2a and 2b are a schematic wiring diagram of a control system in accordance with the invention.

The present invention will be described as applied to a rolling mill 10 in which heated billets 11 are supplied from a furnace 12 to a series of reduction stands 13 in which the cross-sectional area of the billet is successively reduced. As many stands are provided as required by the work involved and each succeeding stand operates at a somewhat increased linear speed due to the lengthening effect of the reduction in the stands with the resultant increase in speed as the cross-sectional area of the product moving through the mill becomes smaller. The path of the product passing through the stands 13 includes a survey flag 14 which may be any conventional device to actuate a switch closure or produce other conventional electrical signal output on line 15 when material is passing the position of the flag 14.

The path of travel of the billet continues beyond the survey flag 14 through additional reduction stands 13 and ultimately reaches a shear 16 which is operated by an electrical actuator 17. Located in the vicinity of the shear 16 is a shear flag 18 which produces a switch closure or other electrical signal whenever the material being reduced by the mill is present at the shear 16.

After passing the shear 16 and the shear flag 18 the bar which is produced by the mill actuates a calibration flag 19 which also provides an electrical signal such as a switch actuation. The calibration flag 19 is located on the line a known distance from the shear 16 in order to provide a calibration in terms of counts which will be equivalent to the linear length of the product between the shear flag and the calibration flag as will hereinafter appear. Beyond the calibration flag 19 the severed lengths of the bar produced by the mill are delivered to a cooling bed or other suitable receptacle for the lengths.

The control of the mill in accordance with the present invention is obtained by means of a survey counter 21, a master counter 22 and an auxiliary counter 23, the latter counter being for initial calibration only. The control of these counters is indicated only generally in FIG. 1, the actual details of the circuit arrangement being described herein with reference to FIGS. 2a and 2b. In the arrangement of FIG. 1, the survey counter is shown to be controlled by the output on line 15 from the survey flag 14 while the master counter 22 is controlled by the output of the shear flag 18. The calibration flag 19 supplies a switch actuation for controlling the auxiliary counter 23.

The survey counter 21 may be any suitable device for counting electrical impulses applied thereto on line 10 and capable of being reset electrically to zero when a suitable reset signal is applied thereto. This reset is accomplished without losing any counts that appear at the input line 10. The survey counter 21 is equipped with two preset controls 24 and 25 by which preset counts can be established in the counter by manually adjusting the controls 24 and 25. The numerical value of the count established by the respective controls 24, 25 may be indicated by suitable dial indicators 26 and 27. The operation of the counter 21 is such that a switch actuation is available when the count accumulated in the counter equals one of the preset counts set by the control 24 or 25.

The master counter 22 may be a device similar to the survey counter 21 and capable of accumulating counts in response to electrical impulses on line 10 and switch closures received from the shear flag 18. The counter 22 has two preset controls 31 and 32 and a reset control 33, by which preset counts can be established. Dial indicators 34, 35 and 36 may be provided by indicating the preset counts established in the counter 22. The characteristics of the master counter 22 provide switch actuations upon the count accumulated in the counter corresponding to the number of the preset count established by the controls 31 and 32. The counter 22 is capable of being reset to zero by an electrical input or reset to the preset count established by the setting of control 33. For the latter condition counting starts at the preset value set on dial 36 instead of starting from zero.

The auxiliary counter 23 operates in response to electrical signals from the line 10 and the calibration flag 19 to accumulate counts during an interval related to actuation of the calibration flag 19.

In each instance, the counters 21, 22 and 23 are actuated by the above described inputs from the various flag controls to count impulses obtained from a pulse generator 28 which operates from a final finishing stand 29 to provide an electrical signal bearing a predetermined relation to the linear speed of the product through the stand 29. For convenience of operation the electrical pulse output of the generator 28 is arranged to be one pulse per linear foot of travel of the product through the stand 29. This pulse rate is applied to each of the counters 21, 22 and 23 so that the counts accumulated in the respective counters represent feet of travel of the product through the final finishing stand 29.

Referring now to FIGS. 2a and 2b assembled as indicated, a description of a complete circuit of a preferred embodiment of the control system of the invention will be described. The circuit comprises a number of branches connected between electrical power lines 41 and 42. The circuits connected between the power supply lines 41 and 42 will be described briefly for identification with their operation to control the system in accordance with the invention set forth hereinafter. The shear flag 18 has a normally open contact 18a serially connected with a control relay 2CR between the lines 41 and 42. The contact 18a is open whenever there is no product passing beneath the shear flag 18. Consequently, when there is product present in the position of the shear flag 18, contact 18a is closed and relay 2CR is energized. A set of normally closed contacts 43 actuated by the relay 2CR is serially connected to energize a time delay relay TR whenever the relay 2CR is not energized. A relay 3CR is connected between line 42 and line 41 to be energized through one of two paths, a normally open contact 44 of relay 2CR and a normally open contact 45 of relay TR. The operation of the timing relay TR is such that once it is energized the contacts 45 will remain closed for a short interval after the relay TR is de-energized. The second actuating circuit for the relay 3CR is through normally closed contacts 46 actuated by the calibration flag 19 in series with normally open contacts 47 of relay 3CR. The contacts 46 are closed except during the passage of the product past the location of the calibration flag 19.

A relay 4CR is energized through any one of four different control circuits as follows. A set of normally open contacts 48 on the master counter high preset is connected to energize the relay 4CR. A second circuit for energizing the relay 4CR is through a set of normally open contacts 49 which are actuated by the master counter low preset in series with normally open contacts 51 of a relay 7CR hereinafter described. A third energizing circuit for the relay 4CR is through a normally closed contact 52 which is a switch associated with the shear and designated a limit switch. The limit switch 52 is actuated every time the shear actuates to shear the bar of other product passing the shear 16. The contact 52 is in series with a normally open contact 53 which is operated by the relay 4CR. The fourth circuit for energizing the relay 4CR is a manually actuated switch 54 arranged to energize the relay 4CR for hand cutting of the bar.

A relay 5CR is arranged to be energized by contact 55 actuated by the survey flag 14. Whenever stock is passing the survey flag 14 and present thereunder the contacts 55 are closed to energize the relay 5CR.

A relay 6CR is energized by two alternate circuits, one of which connects the relay 6CR across the lines 41 and 42 through normally open contact 56 associated with the survey counter high preset. The contact 56 closes whenever the survey counter reaches the high preset and this closing is of a momentary nature. The second circuit for energizing the relay 6CR is through normally closed contact 57 actuated by the survey counter low preset and normally open contact 58 actuated by the relay 6CR.

A relay 7CR is energized by two alternate paths one of which includes a normally closed contact 59 operated by the relay 5CR in series with normally open contacts 61 actuated by the relay 6CR. The second energizing circuit for the relay 7CR is through a normally open holding contact 62 of 7CR in series with a normally closed contact 63 actuated by the master counter low preset.

The shear 16 is operated by a shear solenoid 64 which is energized through normally open contact 65 of the relay 4CR. Thus, energization of the relay 4CR operates the shear solenoid to cut the bar passing the shear position.

The survey counter 21 is supplied counting pulses from lines 66 which are energized from the pulse generator tachometer 28. These pulses representing the length of product passing the shear 16 are supplied to the survey counter 21 through normally open contacts 67 of the relay 5CR. Since the relay 5CR is energized by the survey flag contacts 55, the survey counter 21 will count pulses from the line 66 whenever a product is passing the survey flag to close the contacts 55. A set of reset terminals 68 is provided on the survey counter 21 which resets the survey counter to zero whenever the contacts 68 are shorted. Two circuits are provided for shorting the contacts 68, one through a normally closed contact 69 actuated by the relay 5CR and another circuit through a normally open contact 71 actuated by the survey counter high preset. Thus the survey counter 21 will be reset whenever either the relay 5CR is de-energized indicating that no product is present at the survey flag 14 or whenever the survey counter 21 passes a value of the high preset in its counting sequence.

The master counter 22 counts pulses from the line 66 whenever a normally open contact 72 is closed. The contact 72 is actuated by the relay 2CR. Since the relay 2CR is energized whenever the shear flag contact 18a is closed, indicating that there is product present at the shear 16, the master counter 22 counts during the intervals when the product is present at the shear 16. A set of terminals 73 on the master counter 22 provides for resetting the master counter to zero whenever the terminals 73 are shorted. A circuit for shorting the terminals 73 is provided through normally open contact 74 actuated by the relay 4CR and in series with normally open contact 75 actuated by the relay 2CR. Thus the master counter is reset to zero only when both relays 2CR and 4CR are energized simultaneously. This reset of the master counter 22 to zero thus occurs whenever a cut is made by the shear 16. A second set of reset terminals 76 is provided on the master counter 22 to reset the count to a shear delay preset value. The terminals 76 are shortcircuited through a normally closed contact 77 operated by the relay 2CR. The contact 77 is thus open whenever the product is present at the shear flag resulting in the energization of the relay 2CR and hence the reset of the counter 22 to the shear delay preset value occurs only at the end of a bar when the shear flag is released by the absence of material at the shear.

The auxiliary counter 23 receives counting pulses from the line 66 through two alternate circuits which are selectable by a selector switch having contacts 78 and 79 ganged to be in opposite conductivity condition. For the setting of the selector switch shown in FIG. 2a, the closed contact 78 supplies counting pulses through a normally open contact 81 actuated by a relay 3CR to the auxiliary counter 23. For the opposite setting of the selector switch the contact 79 would be closed and contact 78 open for which condition a normally open contact 82 operated by the relay 4CR would supply counting pulses to the auxiliary counter 23. The auxiliary counter 23 has a zero reset circuit 83 operated by a manually actuated reset switch 84.

The operation of the system of the invention will now be described. As a billet travels through the mill the head end reaches the survey flag 14 closing contacts 55 and picking up the relay 5CR. This closes the contact 67 and the survey counter 21 starts counting pulses which are a measure of the distance the final product travels as determined by the pulse rate of the tachometer 28 at the final stand 29. The survey counter 21 continues to count until it reaches a count corresponding to its own high preset at which time the contact 71 closes momentarily resetting the survey counter 21 to zero and the contact 56 also closes energizing the relay 6CR. The relay 6CR remains energized through a holding contact 58 and the normally closed survey counter low preset contact 57. When the survey counter low preset count is reached, the contact 57 opens and the relay 6CR is de-energized. Thus, the relay 6CR is normally picked-up for each length of the bar counted corresponding to the setting of the survey counter high preset. The head of the bar proceeds through the mill for a multiple number of lengths of the bar length to be cut and finally reaches the shear flag 18. The multiple number of lengths between the survey flag 14 and the shear flag 18 is assured by the selection of the location of the survey flag. The head of the bar appearing at the shear flag 18 closes the contact 18a to pick-up the relay 2CR which closes the contact 72 to start the master counter counting. When the master counter reaches its high preset count the switch contact 48 closes momentarily energizing the relay 4CR which seals in through the circuit provided by the normally closed contact of the shear limit switch 52 and the holding contact 53 of the relay 4CR. With the relay 4CR picked-up the contact 65 closes to energize the shear solenoid 64 and make a cut in the bar that is under the shear. Since both relays 2CR and 4CR are now energized, the master counter 22 is reset to zero through the circuit including contacts 74 and 75. After the cut is made, the contact 52 on the shear limit switch opens to let the relay 4CR drop out.

The foregoing counting sequence of the master counter continues until the tail end of the product reaches the survey flag 14. At this time one of two things happens: (1) if the survey counter has counted to above its low preset value, no change is made in the sequence of the master counter; and (2) if the survey counter has not reached its low preset value, the cycle of the master counter is modified as hereinafter described.

For the condition (1) above the passage of the tail of the billet past the survey flag 14 opens the contact 55 dropping out the relay 5CR and terminating the count in the survey counter 21 by opening the contact 67. This action closes the contact 69 to reset the survey counter 21 to zero preparatory to the arrival of the next billet.

For condition (2) above the relay 6CR will be already picked-up due to the previous momentary closure of the high preset contact 56 and the holding circuit through contact 58 and contact 57. The relay 6CR remains energized for condition (2) since the passage of the tail of the billet from under the survey flag opening contact 55 de-energizes the relay 5CR and stops the survey counter 21 from counting, thus the holding circuit through the contacts 57 and 58 is not broken since the survey counter does not reach its low preset to open the contact 57. With the relay 6CR energized and the relay 5CR de-energized, a circuit is made through the contacts 59 and 61 to energize the relay 7CR. This circuit is held through a holding circuit provided by the contact 62 and the master counter low preset contacts 63 which are normally closed. In this fashion, the energization of the relay 6CR is not affected by the emergence of a subsequent billet and the beginning of counting in the survey counter 21 as soon as the head of that billet appears at the survey flag 14. With the relay 7CR picked-up, the contact 51 is closed to provide an energizing circuit for the relay 4CR as soon as the master counter reaches its low preset count and closes switch contact 49. Thus the detection of the tail of the billet when the survey counter 21 has not reached its low preset count results in a cut being made by energizing the relay 4CR the next time the master counter reaches its low preset value. This alternate length of cut is established by the master counter low preset to be of such length as to make all of the lengths cut by the mill above a predetermined minimum for convenience and economy of handling in subsequent operations.

The operation of the counters to insure all cut lengths greater than a predetermined minimum is as follows. Assume that it is desired to have a normal length cut of 185 feet and that the minimum length desired is 75 feet. Then the high preset for both the master counter and the survey counter will be set for the count corresponding to 185 feet and the low preset of the survey counter is set to a count corresponding to the minimum length preset which may be, for example, 75 feet. The low preset of the master counter is set to the alternate length of cut preset value which may be, for example, 100 feet. For these settings if the tail end of the product releases the survey flag 14 when the count in the survey counter 21 is above the minimum length preset, the master counter will continue to operate without change to cut lengths of 185 feet as determined by its high preset count with the remainder being somewhere between 75 and 185 feet in length as previously detected by the survey counter. If the tail end of the billet releases the survey flag 14 when the survey count is less than the minimum length preset, i.e. somewhere between zero and 75 feet, the master counter 22 the next time it reaches the alternate length of cut preset which in the present example is 100 feet, will energize the shear to cut a 100 foot length of bar. After this cut the master counter will resume cutting the desired 185 foot lengths until the last piece comes through the shear and due to the action of the alternate length of cut preset, the remainder, in this case, will be 185+20−100=105 feet. The value of 20 in this equation corresponds to the count which was present at the survey counter when the tail of the billet released the survey flag. Any other value between zero and 75 feet would change the length of the remainder but in no event would it be less than 85 feet and hence the minimum length cut would be greater than the 75 foot minimum established for the equipment in this particular mode of operation.

The function of the auxiliary counter 23 is as follows. With the selector switch in the position shown in FIG. 2a with contact 78 closed and contact 79 opened the auxiliary counter 23 counts through closed contact 81 whenever the relay 3CR is energized. This corresponds to the condition when the billet head end of the billet reaches the shear flag 18 to close contact 18a and pick-up relay 2CR whereby closing contact 44 to energize the relay 3CR through the time delay contact 45 which remains closed momentarily after the contact 43 opens. The auxiliary counter 23 thus counts until the head of the bar reaches the calibration flag 19 since a holding circuit is provided through the holding contact 47 and the normally closed contact 46 of the calibration flag. When the head of the bar reaches the calibration flag 19 the contact 46 opens, de-energizing the relay 3CR and stopping the count in the auxiliary counter 23. By adjusting the distance between the shear flag 18 and the calibration flag 19 to the known length, the calibration of the counting pulse rate in terms of counts per unit length can be achieved and used to modify the settings of the various counters in the event that a one-to-one relation between counting pulses and units of length is not feasible in the system. The operator may then manually reset the auxiliary counter 23 with the switch 84 after he has read the counts on the auxiliary counter to obtain a calibration of the system in terms of counts per unit length.

For a setting of the selector switch opposite to that shown in FIG. 2a the contact 79 would be closed and the contact 78 open. In this position the auxiliary counter 23 measures the count delay corresponding to the time interval between when the shear signal is applied electrically and the time that the actual cut is made. For this purpose the shear signal resulting from the energization of the relay 4CR closes the contact 82 thereby starting the count in the auxiliary counter 23. This count is started without any product passing through the mill and a cut is simulated by closing the manual hand cut switch 54 to energize the relay 4CR. The relay 4CR is de-energized by the opening of the contact 52 of the shear limit switch and the count accumulated in the auxiliary counter 23 during this interval represents the shear delay. This count is then set as the shear delay preset in the master counter 22 and this is the value to which the master counter is preset whenever the contact 77 is closed corresponding to a de-energized condition for the relay 2CR. Thus each time a new billet head end arrives at the shear to close the contact 18a and energize the relay 2CR, the master counter 22 will start counting from the shear delay preset value. The first cut which is made will, therefore, be initiated at a time corresponding to the length of the piece to be cut less the distance the product will travel as the shear falls. Accordingly the first cut will be of the proper length even though there is some delay in actuating the shear. As long as the shear flag contact 18a is closed the reset of the master counter 22 is to zero and the delay compensation is inherently present for all of the pieces subsequently cut from the same billet. When the tail piece of that billet drops the shear flag to de-energize the relay 2CR the master counter 22 is again preset to the shear delay preset in order to compensate for the shear delay in the next billet group which is cut.

From the foregoing description it will be understood that the survey counter 21 and the master counter 22 count pulses from the generator 28 which represents units of length of the finished product as it enters the shear. Although the survey counter is controlled by the survey flag 14 where the product has a much lower linear speed than the finished product at the shear flag 18, the count accumulated in the survey counter 21 for any weight of product passing the survey flag 14 will be equal to the count accumulated in the master counter for the same product weight passing (at much higher linear speed) the shear flag 18. This relation holds because the ratio of the length of a given quantity of steel to its linear speed (length per unit time) at any point in the mill is constant.

It will also be noticed that the present invention contemplates mill operation in which there are no growing or shrinking loops between the survey flag 14 and the shear flag 18. The mill is normally adjusted to achieve this condition on the trial bars used to set up the mill.

While a particular specific embodiment of the control circuit of the invention has been described it will be apparent to those skilled in the art that many modified arrangements are feasible for utilizing the teachings of the present invention to achieve prediction of the ultimate length of the final piece being cut from a random size of stock running through the mill. Accordingly such modifications as fall within the scope of the appended claims are to be considered within the purview of the present invention.

I claim:

1. Apparatus for cutting elongated product into sections as it moves in the direction of its length, comprising a shear lying in the path of movement of the product, a first means for sensing passage of said product in said path upstream from said shear and determining the length of the remainder section of the product above the largest whole number of sections of predetermined normal length, a second means for controlling the shear to cut the product into the said whole number of sections of predetermined normal length, and a third means operative in response to sensing by said first means of the length of the said remainder section above a predetermined minimum length to allow the shear to cut the product into the said whole number of sections of normal length and operative in response to sensing of the length of the said remainder section below the said minimum length to cause the shear to cut one of the sections preceding the said remainder section to a predetermined intermediate length selected to make the actual remainder section larger than the said minimum length.

2. Apparatus for cutting elongated product into sections as it moves in the direction of its length, comprising a shear lying in the path of movement of the product, a tachometer generating electrical pulses at a rate indicative of the speed of the product at a given position in said path, a flag indicating at all times the presence or lack of presence of the product at a fixed position in said path, a survey counter which counts pulses from the tachometer only when said flag indicates the presence of the product, said survey counter determining the length relative to a predetermined minimum length of the remainder section of the product above the largest whole number of sections of predetermined normal length, and means operative in response to detection by said survey counter of the length of the said remainder section above a predetermined minimum length to allow the shear to cut the product into the said whole number of sections of normal length and operative in response to detection of the length of the said remainder section below the said minimum length to cause said shear to cut one of the sections preceding the said remainder section to a predetermined length intermediate of the normal length and the minimum length selected to make the actual remainder section equal to or longer than the said minimum length.

3. Apparatus for cutting elongated product into sections as it moves in the direction of its length, comprising a shear lying in the path of movement of the product, a tachometer generating electrical pulses at a rate indicative of the speed of the product at a given position in said path, a flag indicating at all times the presence or lack of presence of the product at a fixed position in said path upstream from said shear, a survey counter which counts pulses from the tachometer only when the flag indicates the presence of the product, the survey counter determining the length of the remainder section of the product above the largest whole number of sections of predetermined normal length, a master counter which receives pulses from the tachometer, and a minimum length control for comparing a pre-set predetermined minimum length with the length of said remainder section for rendering the master counter operative if the length of the said remainder section is above said predetermined minimum length to allow the shear to cut the product into the said whole number of sections of normal length and operative if the length of the said remainder section is below the said minimum length to cause the shear to cut one of the sections preceding the said remainder section to a predetermined length intermediate of the normal length and the minimum length, so that the actual remainder section is equal to or longer than the said minimum length.

4. Apparatus for cutting elongated rolling mill product into sections as it moves in the direction of its length toward a cooling bed, comprising a shear lying in the path of movement of the product between the mill and the bed, a tachometer generating electrical pulses at a rate indicative of the speed of the product at a position within a mill, a flag upstream from said shear indicating at all times the presence or lack of presence of the product at a fixed position in said path in the mill, a survey counter which counts pulses from the tachometer only when said flag indicates the presence of the product, the survey counter receiving pulses from the tachometer and determining the length of the remainder section of the product above the largest whole number of sections of predetermined normal length, a master counter which also receives pulses from the tachometer, a pre-set control for the survey counter to place the survey counter in a first condition if the detected length of the said remainder section is above the predetermined minimum length corresponding to the pre-set valve established on said pre-set control and in a second condition if the detected length of the said remainder section is below the said minimum length, the pre-set control being connected to the master counter and rendering the master counter operative if the pre-set control is in the first condition to allow the shear to cut the product into the said whole number of sections of normal length and operative if the pre-set control is in the second condition to cause the shear to cut one of the sections preceding the said remainder section to a predetermined length intermediate of the normal length and the minimum length, so that the actual remainder section is equal to or longer than the said minimum length.

5. Apparatus for cutting elongated product into sections longer than a predetermined minimum length as said product moves in the direction of its length comprising a shear in the path of movement of said product, means for normally operating said shear to sever successive sections of said product to normal length, means for determining at a point on said path upstream from said shear the length of the remainder section of said product above the largest whole number of sections of said normal length produced from a discrete quantity of said product, means responsive to detection of the length of said remainder section greater than said minimum length for maintaining normal operation of said shear and means responsive to detection of the length of said remainder section less than said minimum length for operating said shear to cut at least one shorter section of said product of length less than said normal length but greater than said minimum length, the excess product length in said remainder section provided by cutting said shorter section being sufficient to make said remainder section greater than said minimum length.

References Cited in the file of this patent

UNITED STATES PATENTS

| | | |
|---|---|---|
| 1,179,119 | Lyon | Apr. 11, 1916 |
| 1,184,076 | Cohn | May 23, 1916 |
| 2,655,994 | Vandenberg | Oct. 20, 1953 |
| 2,950,640 | Camp | Aug. 30, 1960 |
| 2,958,243 | Voster | Nov. 1, 1960 |
| 2,990,741 | Haase et al. | July 4, 1961 |

FOREIGN PATENTS

| | | |
|---|---|---|
| 812,450 | Great Britain | Apr. 22, 1959 |
| 870,571 | Great Britain | June 14, 1961 |